Oct. 17, 1933.  H. E. MUCHNIC  1,930,654
PISTON CONSTRUCTION
Filed Feb. 6, 1929
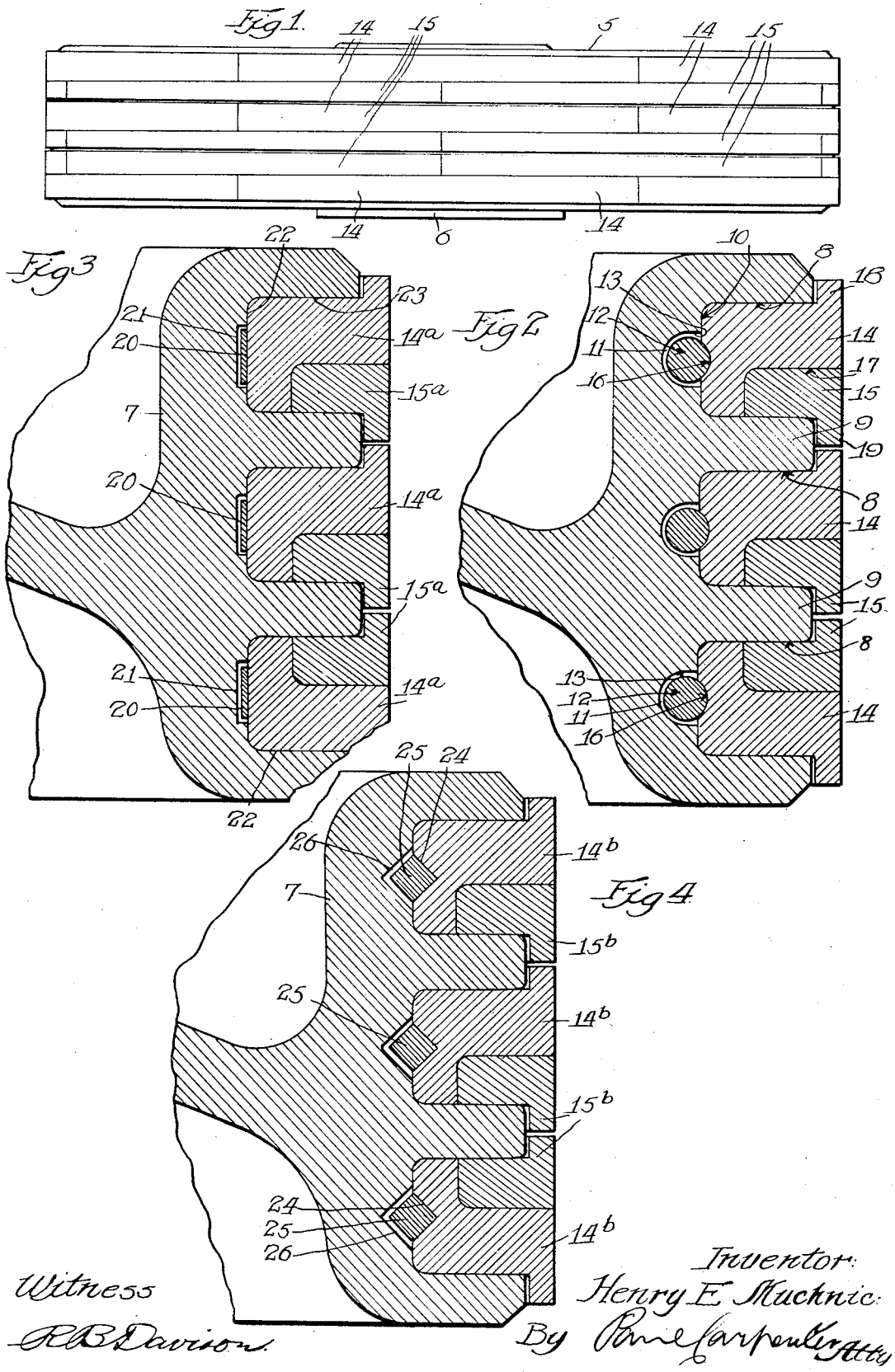
Witness
R. B. Davison
Inventor:
Henry E. Muchnic
By Rene Carpenter Atty Patented Oct. 17, 1933

1,930,654

UNITED STATES PATENT OFFICE 1,930,654

PISTON CONSTRUCTION

Henry E. Muchnic, Atchison, Kans., assignor to The Locomotive Finished Material Company, Atchison, Kans., a corporation of Kansas Application February 6, 1929. Serial No. 337,943

4 Claims. (Cl. 309—29)

This invention relates to piston and ring construction, and more particularly, to improvements in the construction and mounting of the piston rings and the ring groove and expanding or extending member whereby to reduce the material loss upon renewal and in order to provide means for guiding the expanding member in use.

The principal objects and advantages of this invention reside in the provision of an improved piston and piston ring construction wherein a non-continuous ring is employed for expanding or extending the bull-ring sections; the provision of an improved piston and ring construction wherein leakage past the ring segments is effectually prevented; the provision of an improved piston and ring construction wherein segmental rings are employed which includes the provision of a novel manner of mounting the rings so as to prevent leakage in combination with an improved form of bull-ring whereby to reduce the material loss upon renewal and to prevent chattering or other vibration of the ring; the provision of an improved piston ring construction wherein relative movement of the ring segments may take place without leakage occurring past the piston rings; the provision of an improved piston and ring construction wherein the expanding ring is guided in its movement as the piston ring sections expand and wear and wherein less material is lost at renewals by virtue of the fact that the ring segments do not straddle the expanding member.

Further objects of this invention reside in the provision of bull-ring segments which are recessed on their inner surfaces for receiving the adjacent surface of the expanding member so that vibration of the ring in operation is effectually prevented; and the provision of an improved construction of segmental bull or piston ring in which certain of the sections thereof are supported on other sections thereof.

The foregoing and such other objects and advantages as may appear or be pointed out as this description proceeds are attained in the structural form of the invention shown in the accompanying drawing in which:

Figure 1 is an elevational view looking at the peripheral side of the piston incorporating the improvements of this invention;

Figure 2 is an enlarged fragmentary sectional view through the peripheral edge of the piston, and Figure 3 and 4 are views similar to Figure 2 showing alternative forms of the invention.

Referring now more particularly to the drawing, the piston 5 as shown in Figure 1, is provided with the usual hub portion 6 which serves to connect the piston to a piston rod. The peripheral portion 7 of the piston may be of conventional form and may either be made integral with the hub or separate therefrom.

The peripheral portion of the piston is provided as in Figure 2 with a plurality of circumferential ring grooves or channels 8, 8, which grooves are parallel to each other and spaced apart by the walls 9, 9.

In Figure 2, three ring grooves have been shown, but it will be understood that one of any number desired or necessary for the purpose may be provided.

The construction of the rings in the three rings shown in Figure 2 is identical, and, therefore, but one of the rings there shown will be described.

The bottom wall 10 of the ring groove 8 is provided with a circumferential channel 11 of sufficient size to accommodate loosely the expanding member 12. The bottom of the channel 11 is of substantially the same curvature as the outside surface of the cylindrical expanding ring 12 and the side walls 13, 13 of said channel are made substantially straight so as to permit of a free in-and-out movement of the expanding member with the bull-ring. In the form shown in Figure 2, the expanding ring 12 is cylindrical in cross-section and is preferably a non-continuous member of resilient material tending to expand, which maintains the same against the undersurface of the piston ring section adjacent thereto.

The piston ring itself includes a plurality of major sections 14, 14 and a plurality of minor sections 15, 15. The inner surfaces of the piston ring sections 14 are provided with arcuate grooves 16 conforming in shape to the external surface of the expanding ring 12 so that the ring in expanded position, as shown in Figure 2, lies in the recesses formed in the inner surfaces of the major ring sections 14.

The major ring sections 14 are cut away as indicated at 17 to accommodate the minor ring sections 15 and both the sections 14 and 15 in each instance, are externally flanged as at 18 and 19 so as to form external surfaces contacting with the wall of the cylinder.

It will be understood that the various sections of the bull-rings 14 and 15 are retained in position by the cylinder walls against the tension of the expanding ring in each instance.

In order to prevent leakage past the various sections of the plurality of packing ring sections, the set of ring sections 14 are cut at different length from the set of ring sections 15 so that at no time can the joints between ring sections in the series 14 come into alignment with the joints in the ring sections 15. Thus the packing ring sections are not held against movement in the piston circumferentially or radially, but are permitted to rotate, and thus more readily conform to the internal surface of the cylinder wall. A more accurate and fluid tight fit will thus be maintained between the piston and the wall of the cylinder.

Referring now to Figure 3, the ring section 14a and the ring section 15a are of substantially the same construction as the ring sections 14 and 15. However, in this form of the invention, the packing ring expanding or extending means that is, the member 20, is made in the form of a flat strip which lies in a complementally formed, though larger, channel 21 cut in the bottom wall 22 of the packing ring groove 23. The construction of the bull-ring in Figure 3 operates substantially the same as the bull-ring 14 in Figure 2, that is, the member 20 serves to maintain the complemental sections of the bull-rings in expanded position.

It will be further observed that the inner surfaces of the major sections 14a of the packing rings are plain surfaces and are not grooved as shown in Figure 2.

Referring now to Figure 4, the packing ring sections 14b and 15b are of substantially the same construction as that shown in Figures 2 and 3, with the exception that the inner surfaces of the major sections 14b are provided with V-shaped grooves 24 which accommodate the expanding ring 25, 25. The member 25 in this instance, is rectangular in cross section and a complementally formed, though enlarged, channel 26 serves to guide this member similarly to the channels 11 and 20 in Figures 2 and 3. In the form of Figure 4, the expanding ring will have a snug engagement with the major sections 14b of the packing rings and will tend to follow them accordingly as they move outwardly during wearing.

It will be observed that in all of the forms of invention shown in the drawing, the minor ring sections, in each instance, are disposed inwardly of the general packing structure, where three sets of rings are employed as shown in the drawing, this means that two of the minor ring sections will be presented immediately adjacent each other. This facilitates introduction of the piston into the cylinder and will also tend to prevent any accidental tilting of the minor ring sections which might occur as they are placed on the outside instead of on the inside.

It will also be observed that the piston or bull ring major sections abut the bottoms of the grooves and do not rest on the spring or expanding rings. As the weight of the piston is in operation directly on the bull ring sections, it will be readily understood that by resting on the bottoms of the grooves there is not the large pressure applied to the spring rings themselves.

From an inspection of the drawing, it will be observed that where it becomes necessary to renew the piston ring sections, less loss of material occurs where renewal of the piston ring becomes necessary due to the fact that the piston ring sections do not straddle the expander as in some of the prior art known to me. In some instances, the straddling of the expander by the piston ring section tends to weaken the piston ring section, and, furthermore, results in the necessity of making the grooves deeper and making the piston ring sections larger, which does not make for economy in construction.

Having thus described my invention and illustrated its use, what I claim as new and desire to secure by Letters Patent is:

1. An article of manufacture comprising a piston head having a channel in its rim and a groove formed at the bottom of said channel; a resilient ring disposed within said groove; packing rings disposed in said channel over said resilient ring, and radially movable relative to said piston head; supporting rings disposed in said channel at the opposite sides of said packing ring assemblage, radially movable relative to said piston head; and annular flanges rigid with said head interposed between said packing ring assemblage and said supporting rings adapted to maintain the packing ring assemblage and supporting rings against impingement one upon the other, when the rings are subjected to axial thrust, thereby maintaining the freedom of said rings for relative radial movement.

2. An article of manufacture comprising a piston head having spaced apart channels in its periphery, the said channels being formed with grooves in the bottoms thereof; packing rings disposed in one of said channels and radially movable relative to the piston head; supporting rings disposed in the other of said channels on opposite sides of said packing rings and radially movable relative to said piston head; and resilient means disposed in said grooves.

3. An article of manufacture comprising a piston head having spaced apart circumferential channels in its periphery; packing rings disposed in one of said channels; supporting rings disposed in the other of said channels on opposite sides of said packing rings; all of said rings being radially movable and normally seated in the bottoms of said channels; and resilient rings disposed in the channels beneath the packing rings and the supporting rings.

4. An article of manufacture comprising a piston head having spaced apart circumferential channels in its periphery; segmental packing rings and segmental supporting rings in said channels, the packing ring segments being disposed intermediate of the supporting rings; all of said segments normally seating on their bottoms and having laterally disposed lips at their outer perimeters overlying the outer perimeter of the piston-head, with the radial distance between the seating surfaces of the segments and said lips such that said lips will not carry the weight of the piston head and all of said rings being radially movable relative to the piston head; and resilient means disposed in the channels beneath the rings.

HENRY E. MUCHNIC.